Patented Mar. 11, 1930

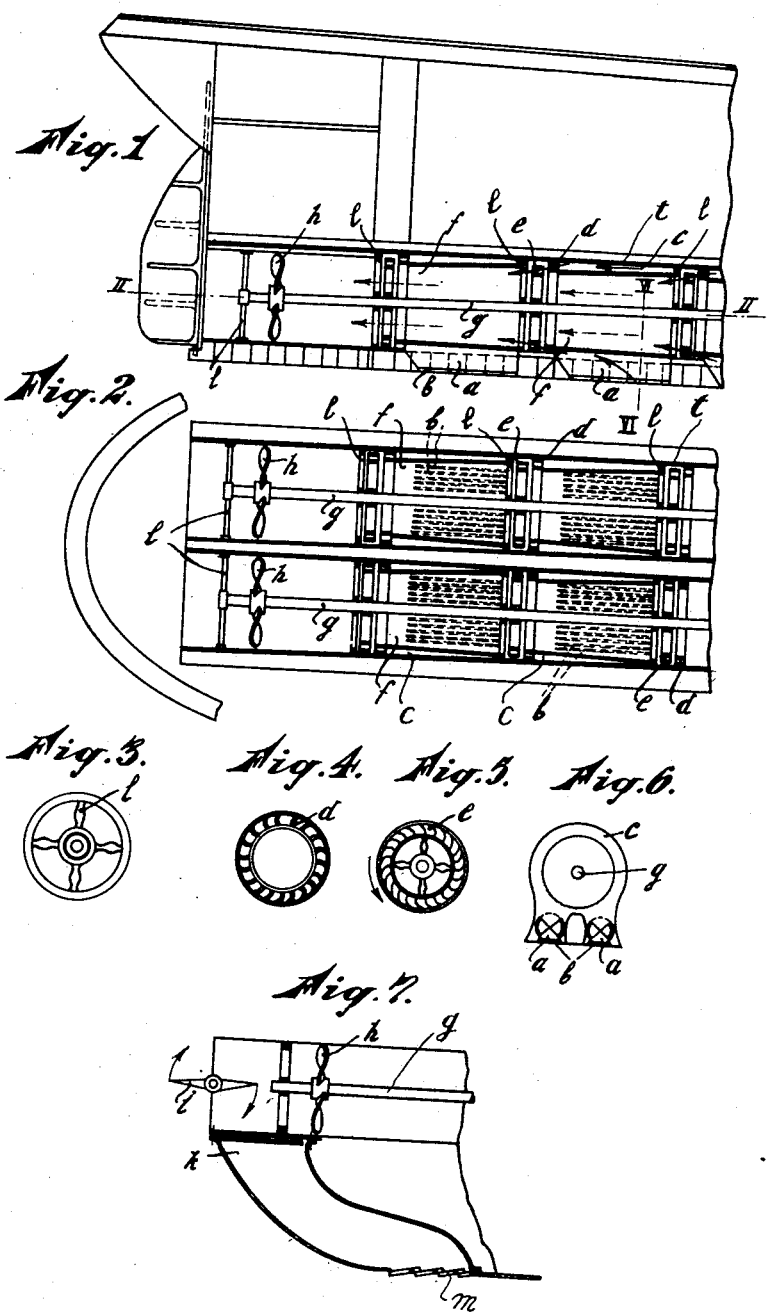

1,749,815

UNITED STATES PATENT OFFICE

SIMEON HAMMERSTEIN, OF ROTTERDAM, NETHERLANDS

PROPELLING MECHANISM FOR SHIPS

Application filed July 9, 1928, Serial No. 291,414, and in the Netherlands July 11, 1927.

This invention relates to propelling apparatus, especially for ships with deep draught, in which the outboard water under pressure which is led in through inlet ports is conducted into turbines which are arranged axially one behind another and are separately driven, these turbines being mounted in a common suction tube extending from the bow to the stern and increasing in diameter and in which a propeller mounted in the tube at the stern draws in the water coming from the turbines and exhausts it as a closed water column backwardly in order to propel the ship forward, and to propel the ship backwardly, exhausts it through a channel connected with the stern and directed forwardly. The blades of the turbine traversing wheels as well as the bearings of the turbine shaft are arranged in the suction tube in such a way that the water coming from the separate turbines may flow away through the tube with as little resistance as possible. The advantage of the invention is that the outboard water, which is under high pressure, may be also used for driving the ship, whereby the mechanical driving power may be decreased in proportion to the water pressure.

In the accompanying drawing:

Figure 1 is a vertical longitudinal section of the stern portion of a ship with the turbine group mounted in a common tube and arranged one behind another, Fig. 2 is a horizontal section on line II—II, Fig. 1, Fig. 3 shows a bearing for a turbine shaft, Fig. 4 is a front view of a turbine guide wheel, Fig. 5 is a front view of a turbine traversing wheel, Fig. 6 is a sectional view of a water space with its inlet port for the outboard water, the section being taken on line VI—VI, Fig. 1, Fig. 7 shows the arrangement of the water exhaust channel for moving the ship rearwardly.

The outboard water, after having first passed through a grid $b$ arranged in or adjacent to the ship's bottom, enters under pressure through the inlet ports $a$ (Figs. 1 and 6) in the direction of the full-line arrows and then passes into a succession of annular spaces $c$ disposed in line within a longitudinal tunnel $t$ constituted by a closed space formed in the hold of the ship's bottom and in which the entire mechanism is arranged. Each such space surrounds a suction tube $f$, and from said spaces the water passes through the stationary turbine guide wheels $d$ into the traversing wheels $e$ which are connected to the turbine shaft $g$, and then through the suction tube $f$ directly in rear of it, from which it is sucked and exhausted in the direction of the dotted-line arrows by the action of the propeller $h$ fixed on shaft $g$ within the rearmost tube $f$, by which the forward or backward movement of the ship is produced. For moving the ship forward, the water is exhausted rearwardly from the tube; and for effecting backward movement of the ship the said rearmost tube is closed by means of a valve $i$ (Fig. 7) and the water is exhausted by opening a channel or passage $k$ directed toward the bow of the ship. This channel $k$ is provided with a suitable valve $m$ at its forward end which opens automatically under the pressure within the ship when valve $i$ is closed.

The turbine shafts $g$ are supported in bearings $l$, one of which is represented in Fig. 3, and the guide wheels $d$ and the traversing or blade wheels $e$ of the turbines are disposed directly in advance of the larger or forward ends of the spaces $c$, which latter are made funnel-shaped or tapering. The arrangement of the propeller within the suction tube means, of course. that the propeller works only on water which has already exerted work on the turbines, so that the entire amount of water which the propeller uses can serve as a basis for the turbine calculation. The spokes of the turbine shaft bearing may be shaped to form rigid blades which act, in a sense, as counter-propellers.

As illustrated in Fig. 2, the mechanism is of twin or duplex character, but the foregoing description will apply to both halves or portions of the mechanism.

I claim:

1. In ship's propelling mechanism, a longitudinal tunnel located in the bottom of the hold of a ship; a series of funnel-shaped suction tubes disposed in axial alinement within the tunnel and coacting with the latter to define a series of funnel-shaped water spaces intermediate the tunnel and the suction tubes, said spaces having inlets to permit entrance of outboard water; sets of turbine elements between adjacent ends of the tubes; a turbine shaft extending axially through said tubes and to which certain elements of the turbine sets are connected; and a propeller fixed to said shaft within the rearmost tube adjacent the rear end of the latter to act on the water which has already exerted work on the turbines, said propeller exhausting the water at the stern of the ship during normal forward movement of the ship.

2. Propelling mechanism, according to claim 1, in which a closure valve is provided at the outlet end of the rearmost suction tube, and a channel is provided at the ship's bottom leading from the stern toward the bow to exhaust the water when said valve is closed and thereby effect backward movement of the ship.

In testimony whereof I affix my signature.

SIMEON HAMMERSTEIN.